G. H. SMITH.
BEET HARVESTER.
APPLICATION FILED APR. 6, 1909.
1,026,835.
Patented May 21, 1912.
3 SHEETS—SHEET 1.
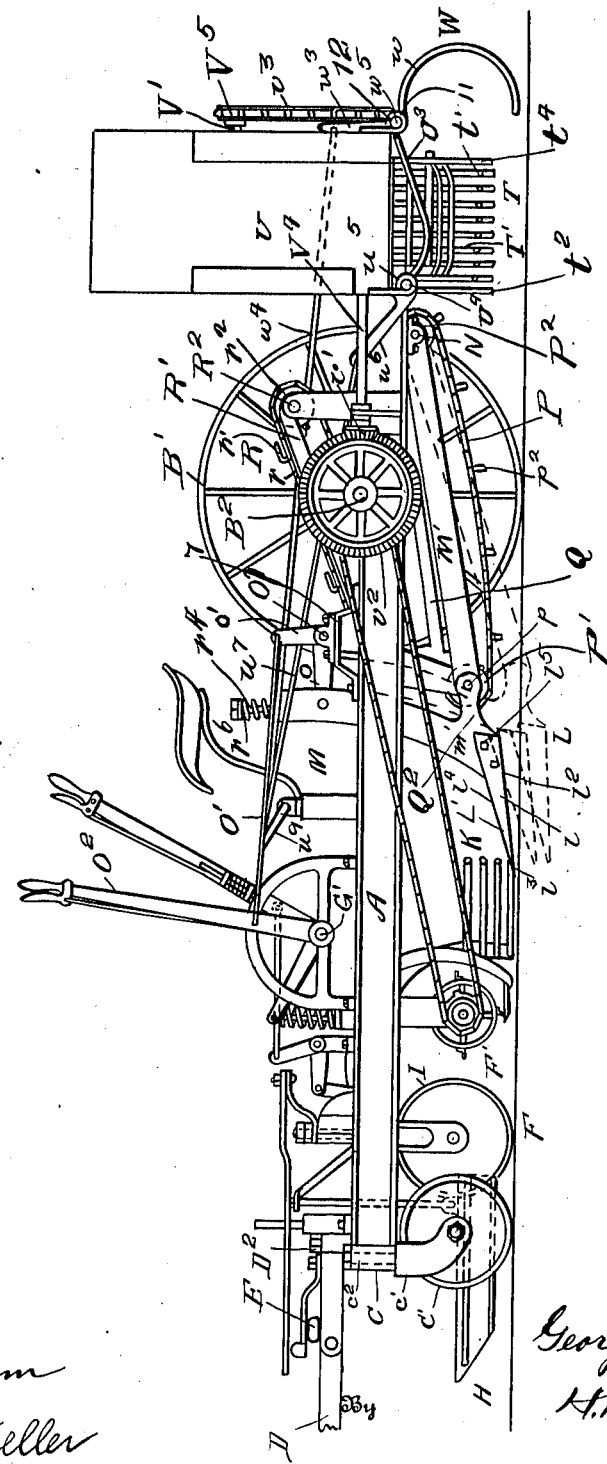

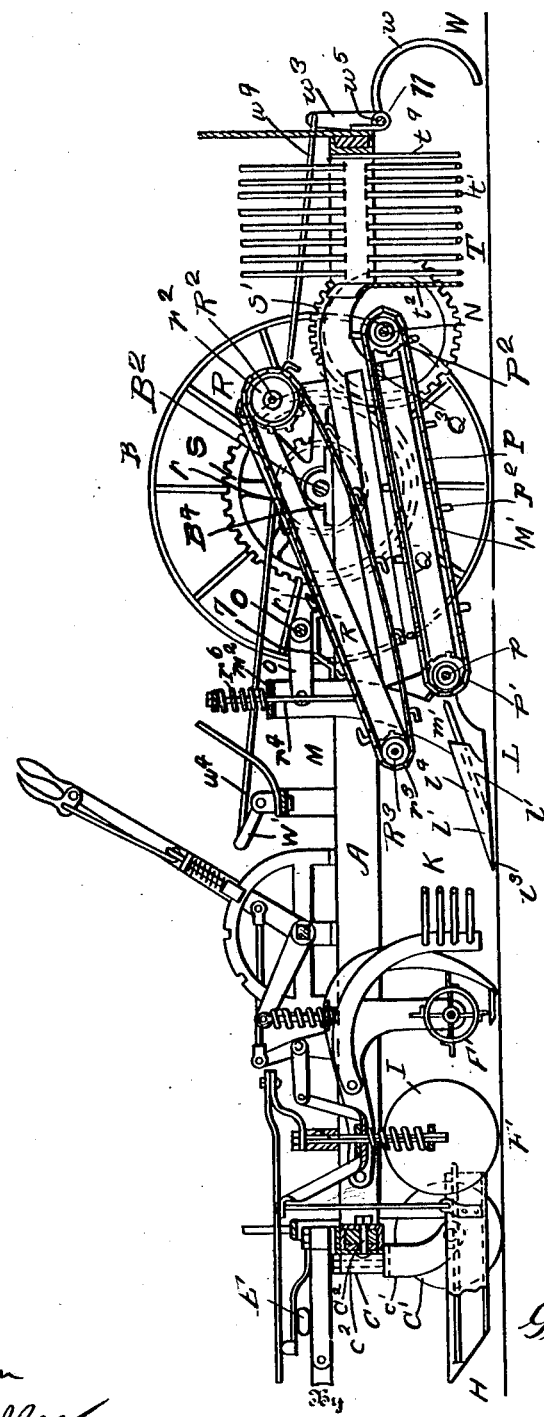

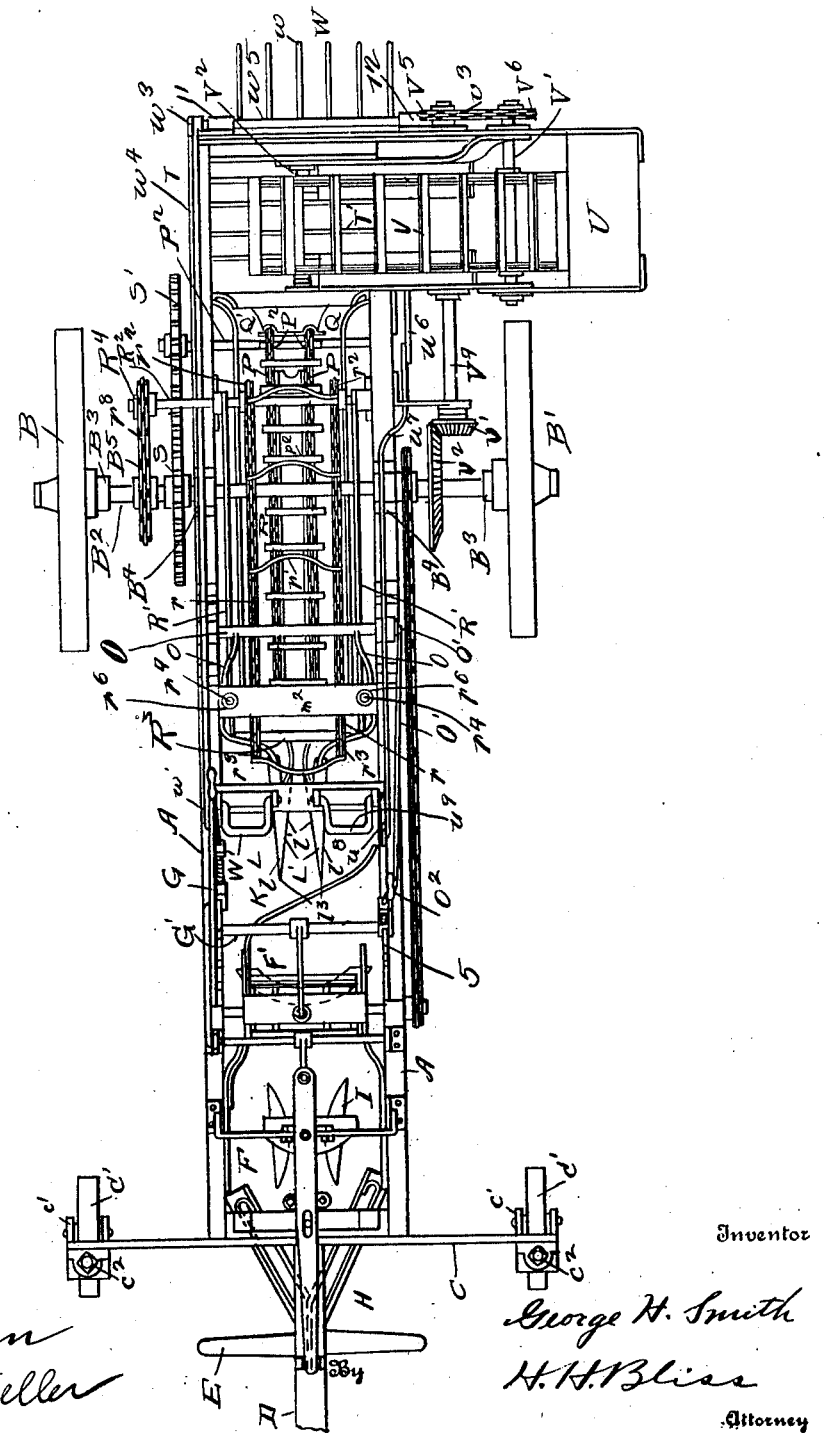

UNITED STATES PATENT OFFICE.

GEORGE H. SMITH, OF BROUGHTON, OHIO.

BEET-HARVESTER.

1,026,835.  Specification of Letters Patent.  Patented May 21, 1912.

Original application filed February 24, 1908, Serial No. 417,549. Divided and this application filed April 6, 1909. Serial No. 488,286.

*To all whom it may concern:*

Be it known that I, GEORGE H. SMITH, a citizen of the United States, formerly residing at Garden City, in the county of Finney and State of Kansas, and now residing at Broughton, in the county of Paulding and State of Ohio, have invented certain new and useful Improvements in Beet-Harvesters, of which the following is a specification, reference being had therein to the accompanying drawings.

This invention relates to improvements in machines for harvesting beets and similar vegetables.

The object of the invention is to provide a machine having improved means for carrying the beets or other vegetables away from the digging mechanism, for freeing them from dirt and for depositing them at suitable points.

Other objects of the invention will appear from the following specification and claims.

Figure 1 is a side view of a machine embodying my improvements. Fig. 2 is a longitudinal sectional view. Fig. 3 is a top plan view.

In the drawings, the machine is represented as having a main frame work formed with the side bars A, A, and the main ground wheels B, B', these being mounted upon the axle $B^2$ held in the bearings $B^4$. Between the wheels B, B' and the axle there are backing ratchet devices $B^3$, $B^3$.

At the front end of the machine is an axle-like bar C which supports caster wheels C', C'. This bar is secured to the front cross bar of the main frame by means of the horizontal pivot $C^2$. Each caster wheel is supported in a forked bracket $c'$ having a standard $c^2$ which is pivotally connected with sleeves at the end of the axle bar C.

The draft apparatus comprises the tongue D and the whiffletree E.

F indicates as an entirety a guiding and topping mechanism arranged at the forward end of the main frame. This may be of any usual or preferred type, but for purposes of illustration I have shown the mechanism which is covered by my co-pending application entitled Beet harvesters, filed Feb. 24, 1908, Ser. No. 417,549, of which this application is a division.

In the mechanism shown H represents a forward device for removing the upstanding beet foliage; I is a device for cutting broken down horizontally disposed foliage; F is a cutter for removing a portion of the beet tops; and K is a fender for removing the severed foliage and tops out of the line of motion of the following digging and elevating mechanism.

The pulling or digging mechanism is indicated as a whole by L and comprises two pointed diggers and lifters L', L'. The active parts of each of these are formed of bent steel shaped somewhat like a plow share. Each has an outer plate $l$ and an inner plate $l'$, formed by bending over the inverted sheet along the upward inclined line $l^4$. The outer plate $l$ has a bottom edge $l^2$ adapted to be adjusted when at work in an approximately horizontal line, at an angle to the line of the edge $l^4$ and meeting it at the point $l^3$. The operative part of each puller shoe L' is secured to the vertical leg $m'$ of the puller frame M, the leg parts being connected at the top by the cross bar $m^2$. The rivets or fastening devices are shown at $l^5$ for fastening the pullers L' to the frame legs $m'$. The frame M to which the puller shoes are attached is so supported that it can be raised and lowered. Its supporting and guiding devices are of such nature that the pullers can be raised and lowered in approximately horizontal parallelism. In many earlier machines, these pullers have been supported by a hinge fixed in relation to the main frame, and as a result the points or toes rise and fall on a radius much longer than that governing the movement of the heels of the pullers. In the present machine, using my improved mounting which will be described, the frame rises and falls bodily. The frame or mechanism which I prefer for accomplishing this is shown in the drawings.

O is a rock shaft mounted on the standards 7 on the main frame and carrying crank arms $o$. The crank arms $o$ are pivotally connected to the upper parts of the legs $m'$ of the puller frame M.

O' is a link connected at one end to the rock shaft by means of the crank arm $o'$ and at the other end connected to a hand lever $O^2$, pivoted on the axis of the shaft G'. The hand lever $O^2$ has a detent by means of which it can be locked in engagement with the segment teeth of the bracket 5. By means of this hand lever the frame M can be raised or lowered at the will of the operator. The lower parts of the puller frame M are controlled by the bars M'. The forward end of each of these bars is pivotally connected to the puller frame at $p$ and the rear ends of the bars are mounted on the main frame at N.

It will be noted from a reference to the drawings that the arms $o$ and the bars or arms M' are approximately parallel. The puller frame will therefore move in approximate parallelism. This parallelism would, of course, be exact, if the arms $o$ and M' were exactly parallel and of equal length. I prefer, however, to make the arm M' somewhat longer than the arm $o$ as by this means I obtain a peculiar and advantageous movement of the shoe. This is indicated in Fig. 1. The full lines show the puller shoe in position to enter the ground. It is desirable that in this position the point or toe of the shoe be pointed downward so that the action of the earth will be to draw the shoe in. The dotted lines show two positions of the shoe after it has entered the earth. In the lower of these positions, the bottom edge of the cutter has attained a substantially horizontal position, such as is desirable for operation. By means of supporting devices, such as I have shown, the peculiar movements described can be obtained, with such variations as may be desired, by properly proportioning the relative lengths of the bars $o$ and M'.

The bars M', M' not only serve for the purpose just described but also as means for supporting the elevating or conveying devices which receive the beets and transfer them from the pullers upward and backward. The hinging devices at N and $p$, above referred to, are preferably shafts or suitable links, that at N being mounted in bearings on the under side of the main frame. $P^2$, $P^2$, are sprocket wheels rigidly mounted on this shaft N.

P', P' are sprocket wheels on the shaft $p$. P, P are chains adapted to engage with the sprocket wheels. To the chains are attached flight or carrier bars $p^2$. The upper run of these chains travels in the bottom of a trough-like structure or guide having longitudinal side bars or plates Q, Q'. The beets are delivered into this trough or guide from the pullers and are then caught by the cross bars $p^2$. The trough structure is carried at its lower end by brackets $Q^2$ which are supported on the shaft $p$. Near its upper end it is held by cross bars $Q^3$.

With the carrying and conveying devices just described, I prefer to combine the supplementary conveying devices indicated as an entirety by R. As shown, it comprises frame bars R', R', extending from a shaft $R^2$, mounted on the main frame, forward and down to a second shaft $R^3$. The frame bars are hinged on the shaft $R^2$ so that the front or lower end of this upper conveying element can swing about the rear shaft as a pivot. $r$, $r$ are chains adapted to engage with the sprocket wheels $r^2$ upon the upper shaft $R^2$ and the sprocket wheels $r^3$, $r^3$ upon the shaft $R^3$. These chains are provided with cross bars or flights $r'$. The front end of the frame R', R' is suspended by link rods $r^4$ which are supported at their upper ends upon the top bar $m^2$ of the puller frame M. The rods pass through apertures in this top part $m^2$ and their upper ends are connected to springs $r^6$, which rest upon the top bar $m^2$. By this construction, the lower end of the upper conveyer is free to move up and down to accommodate itself to the material which is being carried. The spring mounting, as above described, permits the upper conveyer to be raised easily. The force of the springs is continually acting to raise this upper conveyer and therefore a very slight pressure from the beets will raise it. It will be noted that the two conveyers are connected at their forward ends to the frame M and that they will therefore be simultaneously raised and lowered with it. The spring $r^6$ is adjusted to keep the conveyers out of contact in all positions.

The shaft N carries gear wheel S', which is adapted to mesh with the gear wheel S upon the axle $B^2$. In this way motion is transmitted from the main drive wheel, through the gear wheels to the lower conveyer. The shaft $R^2$ carries sprocket wheel $R^4$.

$B^5$ is a sprocket wheel mounted upon the main axle $B^2$.

$r^8$ is a drive chain passing from the sprocket wheel $R^4$ and $B^5$ and in this way transmits motion from the main drive wheels to the upward conveyer.

The sprocket wheels and gearing above described are so proportioned that the upper conveyer will be driven at a speed considerably in excess of the speed of the lower conveyer. The beets or other vegetables will be caught by the two conveyers and carried upward and backward, and the more rapid motion of the upper conveyer will cause the beets or other vegetables to be rolled over and tumbled in such a way as to free them from any earth that may have remained attached to them. The beets are delivered from these two primary conveyers into a boot or receptacle behind them, indicated as a whole, by T. As shown this receptacle has a side plate $t$, front wall $t^2$ and a rear wall $t^4$. The bottom part of the conveyer is formed of rods T'. The rods terminate with the free ends $t'$ and are preferably curved to lie approximately concentric with the elevator shaft $V^2$. The other ends of the rods are secured to the side plate $t$ and from this receptacle or boot the beets are carried to a final receptacle, having the compartment U, by means of an elevator or conveyer. This elevator has an upper shaft V' and a lower shaft V². Upon the shafts are sprocket wheels and chains with flights, buckets or lifting devices V. Preferably, the parts of this elevator which engage with the beets are in form of rods or wires, so arranged as to provide a skeleton device which can engage with and carry the beets without danger of cutting or breaking them.

Power is imparted to the sprocket wheels and chains by means of the shaft V⁴, receiving power from the wheel v² on the axle B² through a beveled wheel v'. v³ is a sprocket chain connecting the wheel V⁶ of the shaft V⁴ with the wheel V⁵ on the bearing shaft V' of the elevator.

The bottom of the box or receptacle at U is formed of rods U³ which are secured to the shaft U⁴. The rock shaft is mounted in bearings u⁵ and has a crank arm u⁶. u⁷ is a link or pitman extending to a crank u⁸ carried by a treadle lever u⁹ within reach of the driver's foot. This crank u⁸ and treadle u⁹ are supported in such a way and connected to the pitman in such a manner that the pitman is permitted to move to a line below the axis of the crank u⁸ and the treadle lever u⁹. When in this position the pitman or link u⁷ and the bars U³ at the bottom of the receptacle U are locked against movement until the driver with his foot lifts the treadle up a short distance and thus releases the lock. The driver may thus deposit the beets in heaps either at regular intervals or whenever the receptacle U becomes filled. The beets are thus deposited at a point outside of the line of action of the machine where they may be readily collected and where they will in no way interfere with the action of the raking mechanism hereinafter described.

It will be noted that the carrying and lifting mechanism is open throughout so that loose earth is free to drop from the machine. The agitation of the beets not only between the primary conveyer but also in the receptacle T and the secondary conveyer will serve to entirely free them from dirt.

The leaves and tops which have been forced aside by the deflector K or which have by any chance escaped the deflector and been carried part way through the conveyer mechanism will be caught and gathered together by the raking mechanism indicated by W. This mechanism comprises curved rake teeth w, secured to a rock shaft w⁵. This shaft has a crank arm w³ which, by means of the pitman or link w⁴, is connected to a crank arm w' rigid with a treadle lever W' near the treadle u⁹ and accessible to the foot of the driver. The shaft w⁵ is mounted in bearings 11 and 12 at the rear of the machine. The rake mechanism will serve to collect all the foliage and beet tops, and the driver, by operating the treadle lever, may deposit them in windrows.

What I claim is—

1. In a beet harvester comprising beet pulling plows and means adapted to receive the beets therefrom, the combination with the plows of a vertically movable upright plow frame to which the plows are secured in normally substantially horizontal positions, means for raising and lowering the frame and the plows, a longitudinal plow frame guiding arm pivotally connected at one end to the upper part of the frame and at the other end to the main frame of the machine, a second longitudinal plow frame guiding arm, substantially parallel to the first arm, connected at one end to the lower part of the frame and at the other end to the main frame, the lower of the arms being longer than the upper whereby the plow frame is guided to hold the plows in slightly downward inclined positions when at or near the surface of the ground and in more nearly horizontal positions when below the surface of the ground, substantially as set forth.

2. In a beet harvesting machine, the combination of beet pulling plows, a supporting frame for the said plows, and a guiding and controlling means for the said frame whereby the plows are pointed downward when in position to enter the ground and whereby they are maintained substantially horizontal when in operative position in the ground, substantially as set forth.

3. In a beet harvesting machine, the combination of beet pulling plows, a frame upon which the plows are mounted, means for raising and lowering the frame, a guiding device for the upper end of the frame, a link pivotally connected at its forward end to the bottom of the frame and at its rear end to the main frame of the machine, an endless conveyer co-extensive with the said link and adapted to be moved with it, and a second endless conveyer above the first, the said second conveyer being pivotally connected at its rear end to the main frame of the machine, and supported at its forward end from the plow frame, substantially as set forth.

4. In a beet harvesting machine comprising a beet pulling mechanism, a backward extending conveying mechanism adapted to receive the beets from the pulling mechanism, the said conveying mechanism comprising an endless conveyer below the beets, an endless vertically adjustable conveyer above the beets, and resilient means for supporting the said upper conveyer whereby a portion of its weight is carried by the said means and a portion by the beets, substantially as set forth.

5. In a beet harvesting machine comprising beet pulling devices, a backward tending elevating mechanism adapted to receive beets from the pulling devices, the said mechanism comprising an endless conveyer below the beets, an endless vertically adjustable conveyer above the beets, means for driving the upper conveyer at a greater speed than that of the lower conveyer, and resilient supporting means for the said upper conveyer whereby a portion of its weight is carried by the said means and a portion by the beets, substantially as set forth.

In testimony whereof I affix my signature, in presence of two witnesses.

GEORGE H. SMITH.

Witnesses:
  E. F. GREENWOOD,
  ROY BAKER.